US007243437B1

(12) United States Patent
Estrada

(10) Patent No.: US 7,243,437 B1
(45) Date of Patent: Jul. 17, 2007

(54) DECODING DEVICE FOR DOUBLE-SIDED KEYS

(76) Inventor: Armando Estrada, 146601 Aradia St., Indio, CA (US) 92201

( * ) Notice: Subject to any disclaimer, the term of this patent is extended or adjusted under 35 U.S.C. 154(b) by 0 days.

(21) Appl. No.: 11/372,834

(22) Filed: Mar. 13, 2006

(51) Int. Cl.
*G01B 11/30* (2006.01)
*E05B 19/20* (2006.01)

(52) U.S. Cl. ............................ 33/539; 33/542; 33/551; 70/394

(58) Field of Classification Search .................. 33/539, 33/540, 542, 551, 553, 554, 555; 70/394, 70/431
See application file for complete search history.

(56) References Cited

U.S. PATENT DOCUMENTS

| | | | | |
|---|---|---|---|---|
| 5,133,202 | A * | 7/1992 | Grant | 70/394 |
| 5,325,691 | A | 7/1994 | Embry | |
| 5,355,701 | A * | 10/1994 | Tobias | 70/394 |
| D391,470 | S | 3/1998 | Johnson et al. | |
| 6,047,479 | A * | 4/2000 | Galestien | 33/553 |
| 6,134,928 | A | 10/2000 | Kang | |
| 6,382,007 | B1 | 5/2002 | Wright | |
| 6,722,172 | B2 | 4/2004 | Pinkhasov et al. | |
| 2005/0011078 | A1* | 1/2005 | Kubota | 33/551 |
| 2005/0092048 | A1* | 5/2005 | Mathena | 70/394 |
| 2005/0148903 | A1* | 7/2005 | Diamantopoulos | 33/542 |
| 2005/0278968 | A1* | 12/2005 | Takahashi | 33/551 |

FOREIGN PATENT DOCUMENTS

| | | | | |
|---|---|---|---|---|
| JP | 52049199 A | * | 4/1977 | 70/394 |

* cited by examiner

*Primary Examiner*—G. Bradley Bennett

(57) ABSTRACT

An electronic device includes a housing and a catheter having a proximal end seated within the housing and a distal end positioned to an exterior thereof. The catheter distal end has an arcuate shape, assisting the user to scan an internal plug cavity, and a cylindrical cross-section provided with a suitable diameter such that the catheter can be probed through a lock plug without contacting pin pairs. A mechanism is included for detecting a point where the pins come together and line up with a shear line. LEDs are coupled to the detecting mechanism and are illuminated when the catheter is displaced along the lower and upper pin pairs. A mechanism is included for automatically adjusting the catheter's position as the point of each of pin pair is detected. A mechanism is included for displaying numeric values on the housing that correspond to the points identified by the detecting mechanism.

12 Claims, 5 Drawing Sheets

DECODING DEVICE FOR DOUBLE-SIDED KEYS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to decoding devices and, more particularly, to a decoding device for quickly determining the dimensions and contours of a first double-sided key and thereby making a second double-sided key having identical dimensions and contours.

2. Prior Art

Locks using key operated systems are widely available and known. Key locking systems, for example, are used in automobiles, homes, offices and industrial buildings, cabinets and other applications and locations requiring limited or restricted access thereto. Often, keys are used to lock important or critical items, such as the aforementioned vehicles, homes, etc. In many instances, keys, which must be carried separately from the lock with which they are to be associated and used, are prone to becoming misplaced, lost and even stolen. A key which is not readily available for use, such as a lost or misplaced key, creates complications for the lock user. While many individuals will have a duplicate or spare key, it sometimes will not be in their possession or readily available. In other instances, there may be no spare keys.

Most commonly, among those keys which are misplaced are included automobile keys, and house keys. In the case of automobile keys, for example, it is often not enough to simply have a locksmith open a car door, since one will need to start the car engine in order for the vehicle to be used. To do this a key must be made. For example, where people have lost keys on vacation, in the ocean or some other place where it is not likely to be recovered, not only must the individual be given access to his or her vehicle, but also, the person must have a key in order to start the vehicle. While many manufacturers provide a key code which enables the mailing of a duplicate key which will fit that specific vehicle, usually the automobile dealers, and not locksmiths, are the only ones with access to the codes and equipment required to make a key which will fit. While a locksmith can obtain access to the automobile, for example, by picking a door lock, generally, this provides little help to the vehicle owner or user who then wishes to drive the vehicle to another location.

While mention was made of certain key codes, car dealers are not open twenty-four hours a day, and sometimes are not close by, rendering it impossible to have a new key made. Today, there are more difficulties encountered by the use of high security vehicle locks. These keys are even more difficult to duplicate and require specialized equipment for their production. High security type keys often include two profiles, one on one side of the key, and another on the opposite side of the key. The profiles are often separated by a wall between them.

In many cases, the only way to make a new key, when one has been lost, is to read the lock. This requires that the lock be disassembled in order to ascertain the proper profile of the key which will fit the lock and open it. This is often an expensive and impractical procedure, since the lock must be removed from its mounting and disassembled. In the case of an automobile, the lock must be removed from the door panel. This is considerably expensive and time consuming. Other difficulties, apart from removal of the lock, include encountering locks which cannot be readily disassembled, but must be destroyed and replaced. Thus if the lock must be destroyed, it will often be useless, except in the case of automobiles, for example, the key is still needed to operate the engine.

In the past, methods have been proposed for decoding locks without the need for disassembly or destruction of the lock. One method includes the use of a visual aid for inspecting the interior of the lock to observe the positions of the individual wafers or tumblers. A prior art example discloses the use of a lamp and probe for holding some of the tumbler wafers out of the way of the line of sight in order to permit observation of other wafer positions. This method requires the accurate estimation of the tumbler positions within the lock based on the observer's visual inspection. Because of small variations in the locations of the tumbler positions, and because of reflections and shadows of light, ascertaining the correct key profile by this method can prove difficult.

Accordingly, a need remains for a decoding device for double-sided keys in order to overcome the above-noted shortcomings. The present invention satisfies such a need by providing a decoding device that is convenient and easy to use, provides for improved vehicle protection, and avoids considerable frustration and unnecessary expenditures. Instead of calling a locksmith or emergency road service truck to the scene for professional assistance, such a decoding device enables the driver/owner to create a duplicate key to unlock the door in an efficient manner. This advantageously saves the person a considerable amount of time, money and effort. Since the door is opened with a key instead of a slim-jim or a coat hanger, no accidental damage is inflicted upon the vehicle's window seals or painted surfaces. The decoding device is reliable, effective, lightweight, and adaptable to a variety of vehicle applications.

BRIEF SUMMARY OF THE INVENTION

In view of the foregoing background, it is therefore an object of the present invention to provide a decoding device for double-sided keys. These and other objects, features, and advantages of the invention are provided by a portable electronic device for quickly determining the dimensions and contours of a first double-sided key for making a second double-sided key having identical dimensions and contours.

The portable electronic device includes a housing. An elongated and slender catheter has a proximal end seated within the housing and further has a distal end positioned to an exterior of the housing. Such a distal end of the catheter has an arcuate shape for conveniently assisting the user to effectively scan an internal cavity of the plug. The catheter has a cylindrical cross-section provided with a diameter that is suitably sized such that the catheter can effectively be probed through a plug of a lock without contacting a plurality of lower and upper pin pairs seated within the plug.

Such a catheter preferably includes a fiber optic wire and a non-conductive coating concentrically positioned about the fiber optic wire.

A mechanism is included for detecting a point where the lower and upper pins come together and line up perfectly with a shear line defined where a cylinder of the lock and a housing of the lock line up. A plurality of LEDs are electrically coupled to the detecting mechanism. Such LEDs are selectively illuminated when the catheter is displaced along the lower and upper pin pairs.

The detecting mechanism preferably includes a processor, a scanner electrically coupled to the processor, and a memory electrically coupled to the processor. Such a memory includes software instructions that cause the detecting mechanism to quickly and effectively detect the point where the lower and upper pin pairs line up with the shear line. The software instructions execute a preprogrammed logic algorithm. Such a logic algorithm includes the steps of calculating a location of the scanner after the scanner has been inserted into the plug, calculating a vertical distance that the lower pins have been displaced from the plug, and generating and transmitting a signal to the numeric value displaying mechanism such that a numeric value corresponding to the vertical distance is digitally displayed in chronological order according to an order of the lower and upper pin pairs.

A mechanism is included for automatically adjusting a position of the catheter as the point of each of the lower and upper pin pairs is detected such that the detecting mechanism becomes automatically positioned next to an adjacent one of the lower and upper pin pairs until the catheter detects a final one of the lower and upper pin pairs within the plug. Such a mechanism for automatically adjusting a position of the catheter may include first and second groups of directly engaged gears nested within the housing and operably conjoined to the processor.

The first and second groups of gears are rotatably biased based upon instructions received from the signal during scanning operations. First and second stabilizing arms are directly coupled to selected ones of the first and second groups of the gears. First and second brackets are statically coupled to the catheter and are removably abutted against the first and second stabilizing arms. Such first and second brackets are nested within the housing and are spaced from remaining ones of the first and second groups of the gears.

A mechanism is included for displaying a plurality of numeric values on the housing. Each of the numeric values corresponds to each of the points identified by the detecting mechanism.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
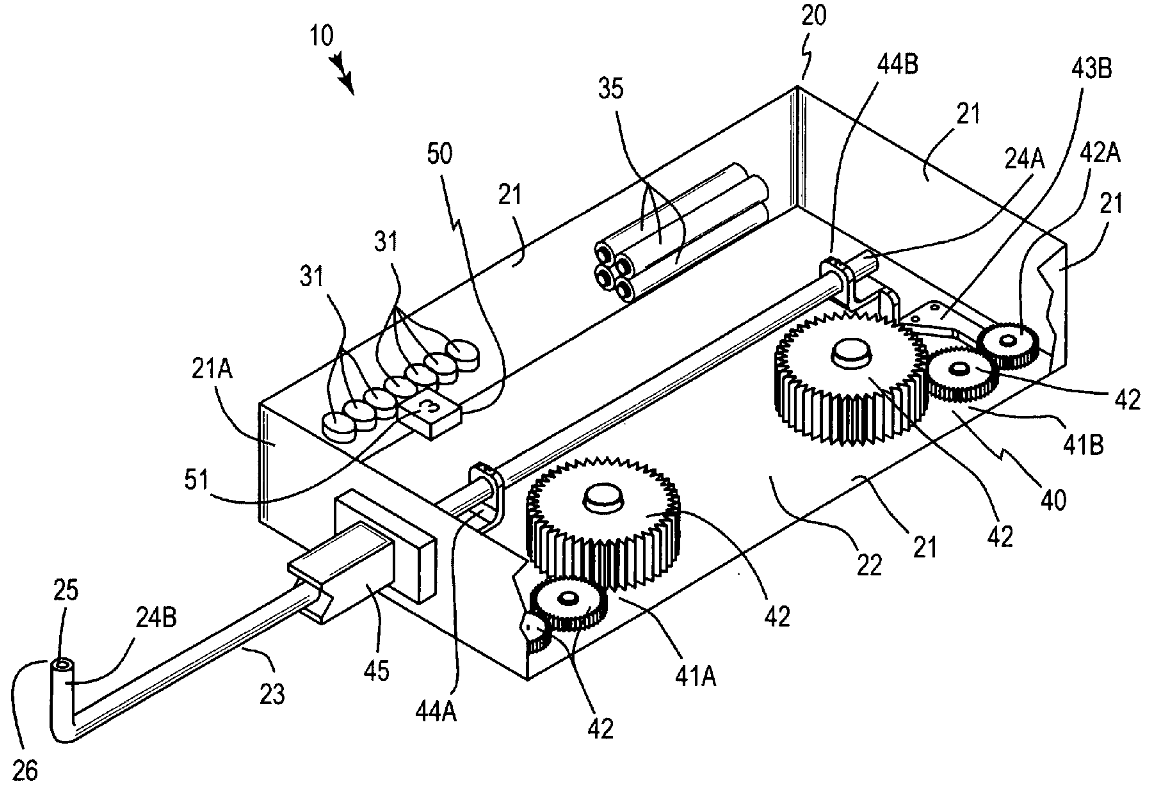
FIG. 1 is a partial cut-away perspective view showing a decoding device for double sided keys, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-7 by the reference numeral 10 and is intended to provide a decoding device for double sided keys. It should be understood that the device 10 may be used to decode many different types of double sided locks and should not be limited in use to only automobile double sided locks.

Referring initially to FIGS. 1, 2, 4, 5, 6 and 7, the device 10 includes a housing 20 that has a plurality of sidewalls 21 monolithically formed with each other and forming a substantially rectangular shape. Such a housing 20 further has a cavity 22 defined between the sidewalls 21. Of course, the housing 20 may be produced in a variety of alternate shapes and sizes, as is obvious to a person of ordinary skill in the art. An elongated and slender catheter 23 has a proximal end 24A seated within the housing 20 and further has a distal end 24B positioned to an exterior of the housing 20. Such a distal end 24B of the catheter 23 has an arcuate shape that is essential for conveniently assisting the user to effectively scan an internal cavity 13 of the plug 12.

The catheter 23 has a cylindrical cross-section provided with a diameter that is suitably sized such that the catheter 23 can effectively be probed through a plug 12 of a lock 11 without contacting a plurality of lower 14A and upper 14B pin pairs seated within the plug 12. Such a catheter 23 further includes a fiber optic wire 25 and a non-conductive coating 26 concentrically positioned about the fiber optic wire 25. The non-conductive coating 26 is crucial and advantageous for isolating the fiber optic wire 25 from any interior surfaces of the plug 12 and also protects the fiber optic wire 25 from other physical damage.

Referring to FIGS. 1, 2, 3 and 7, a mechanism 30 is included for detecting a point where the lower 14A and upper pins 14B come together and line up perfectly with a shear line 15 defined where a cylinder 16 of the lock 11 and a housing 17 of the lock 11 line up. A plurality of LEDs 31 are electrically coupled to the detecting mechanism 30. Such LEDs 31 are selectively illuminated when the catheter 23 is displaced along the lower 14A and upper 14B pin pairs. The detecting mechanism 30 includes a processor 32, a scanner 33 electrically coupled to the processor 32, an internal power supply source 35 electrically coupled to the processor 32, and a memory 34 electrically coupled to the processor 32. Such a memory 34 includes software instructions that cause the detecting mechanism 30 to quickly and effectively detect the point where the lower 14A and upper 14B pin pairs line up with the shear line 15.

The software instructions execute a preprogrammed logic algorithm. Such a logic algorithm includes the steps of calculating a location of the scanner 33 after the scanner 33 has been inserted into the plug 12, calculating a vertical distance that the lower pins 14A have been displaced from the plug 12, and generating and transmitting a signal to the numeric value displaying mechanism 50 (described herein below) such that a numeric value corresponding to the vertical distance is digitally displayed in chronological order according to an order of the lower 14A and upper 14B pin pairs.

Figure 2:
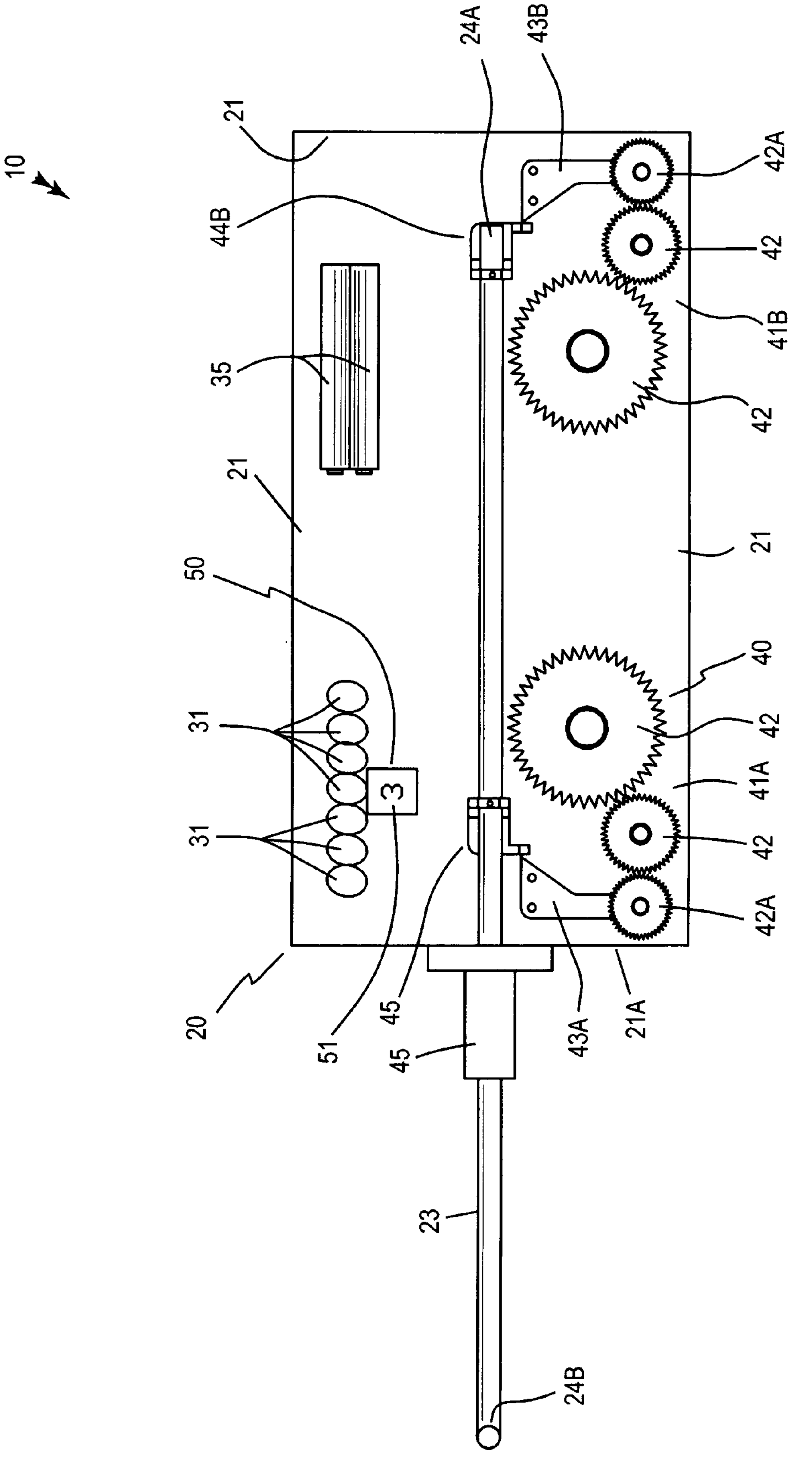
FIG. 2 is a top plan view of the device shown in FIG. 1.
Figure 3:
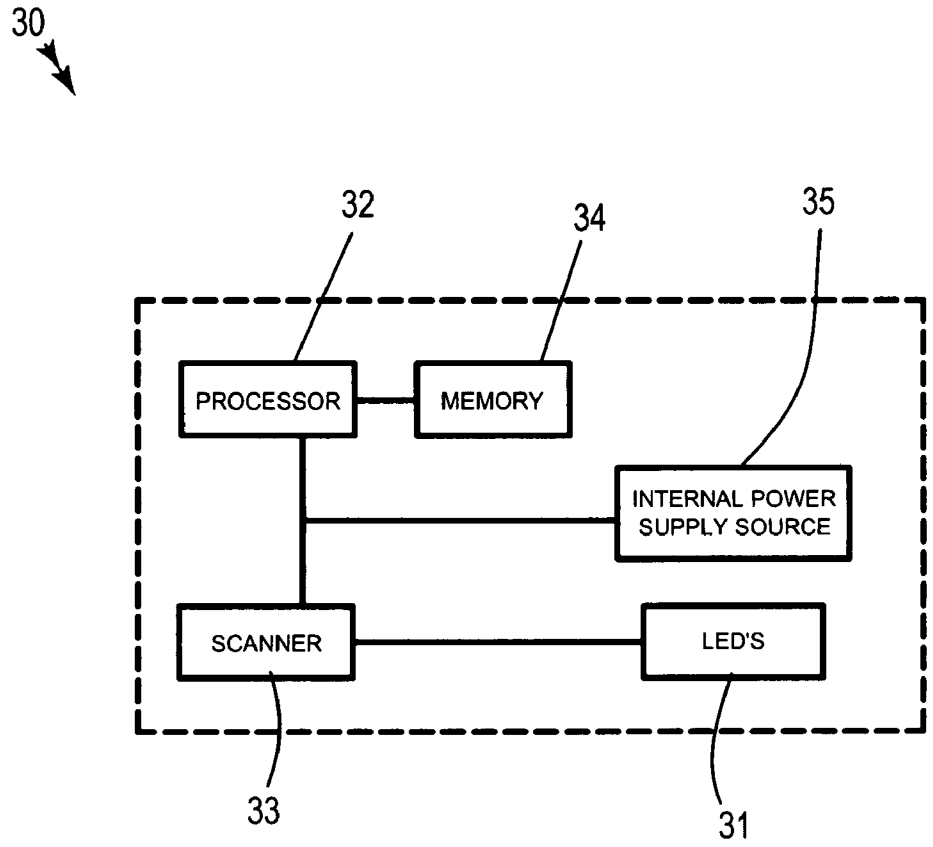
FIG. 3 is a schematic block diagram showing the detecting mechanism, in accordance with the present invention.
Figure 4:
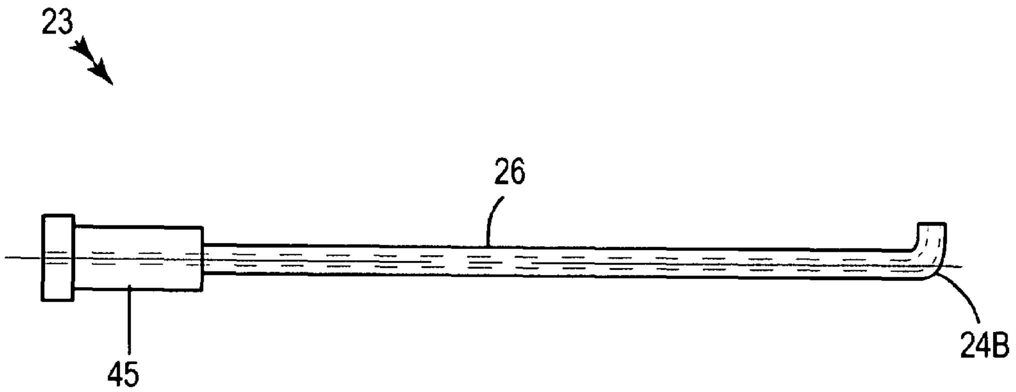
FIG. 4 is a side-elevational view of the catheter shown in FIG. 1.
Figure 5:
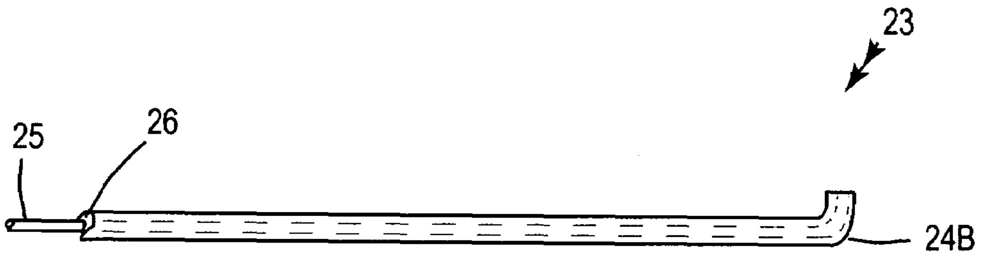
FIG. 5 is a side-elevational view of the catheter shown in FIG. 1, showing the fiber optic wire disposed therein.
Figure 6:
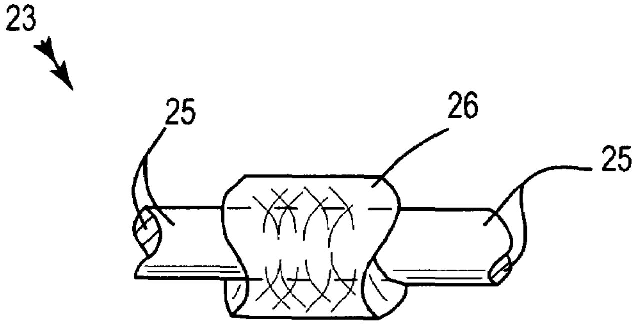
FIG. 6 is an enlarged side-elevational view of the catheter shown in FIG. 5, showing the non-conductive coating concentrically positioned thereabout.
Figure 7:
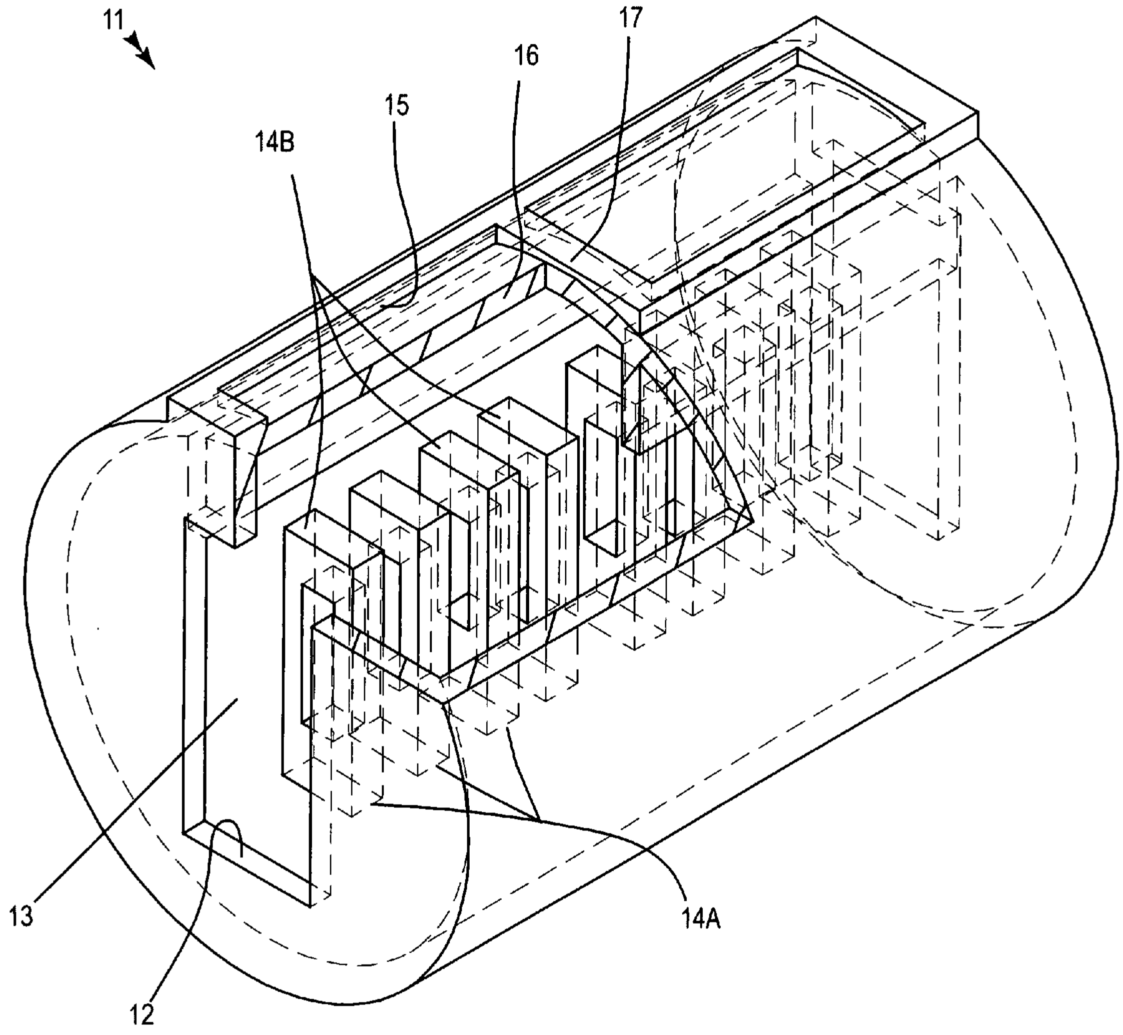
FIG. 7 is a perspective view showing a lock assembly, in accordance with the present invention.

Referring to FIGS. 1 and 2, a mechanism 40 is included for automatically adjusting a position of the catheter 23 as the point of each of the lower 14A and upper 14B pin pairs is detected, which is important and convenient such that the detecting mechanism 30 becomes automatically positioned next to an adjacent one of the lower 14A and upper 14B pin pairs until the catheter 23 detects a final one of the lower 14A and upper 14B pin pairs within the plug 12. Such a mechanism 40 for automatically adjusting a position of the catheter 23 includes first 41A and second 41B groups of directly engaged, without the use of intervening elements, gears 42 nested within the housing 20 and operably conjoined to the processor 32. The first 41A and second 41B groups of gears 42 are rotatably biased based upon instructions received from the signal during scanning operations.

First 43A and second 43B stabilizing arms are directly coupled, without the use of intervening elements, to selected ones 42A of the first 41A and second 41B groups of the gears 42. First 44A and second 44B brackets are statically coupled to the catheter 23 and are removably abutted against the first 43A and second 43B stabilizing arms. Such first 44A and second 44B brackets are nested within the housing 20 and are spaced from remaining ones of the first 41A and second 41B groups of the gears 42. A stabilizing member 45 is directly coupled, without the use of intervening elements, to one sidewall 21A of the housing 20, wherein the catheter 23 passes through the stabilizing member 45. Such a stabilizing member 45 is vital for maintaining the catheter 23 registered along a horizontal plane once the catheter 23 is inserted into the plug 12 of the lock 11.

Referring to FIGS. 1 and 2, a mechanism 50 is included for displaying a plurality of numeric values 51 on the housing 20. Each of the numeric values 51 corresponds to each of the points identified by the detecting mechanism 30. Such numeric values 51 advantageously allows a user to quickly and easily determine the position of the lower 14A and upper 14B pin pairs such that a replacement or spare key can be made.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. A portable electronic device for quickly determining the dimensions and contours of a first double-sided key for making a second double-sided key having identical dimensions and contours, said portable electronic device comprising:

a housing;

an elongated and slender catheter having a proximal end seated within said housing and further having a distal end positioned exterior of said housing, said catheter having a cylindrical cross-section provided with a diameter that is suitably sized such that said catheter can be probed through a plug of a lock without contacting a plurality of lower and upper pin pairs seated within the plug;

means for detecting a point where the lower and upper pins come together and line up perfectly with a shear line defined where a cylinder of the lock and a housing of the lock line up;

means for automatically adjusting a position of said catheter as said point of each of said lower and upper pin pairs is detected such that said detecting means becomes automatically positioned next to an adjacent one of said lower and upper pin pairs until said catheter detects a final one of said lower and upper pin pairs within said plug; and means for displaying a plurality of numeric values on said housing, each of said numeric values corresponding to each said points identified by said detecting means.

2. The device of claim 1, wherein said detecting means comprises:

a processor;

a scanner electrically coupled to said processor;

a memory electrically coupled to said processor, said memory including software instructions that cause said detecting means to quickly and effectively detect said point where said lower and upper pin pairs line up with said shear line, said software instructions executing a preprogrammed logic algorithm including the steps of a. calculating a location of said scanner after said scanner has been inserted into the plug, b. calculating a vertical distance that said lower pins have been displaced from said plug, and c. generating and transmitting a signal to said numeric value displaying means such that a numeric value corresponding to said vertical distance is digitally displayed in chronological order according to an order of said lower and upper pin pairs.

3. The device of claim 1, wherein said means for automatically adjusting a position of said catheter comprises:

first and second groups of directly engaged gears nested within said housing and operably conjoined to said processor, said first and second groups of gears being rotatably biased based upon instructions received from said signal during scanning operations;

first and second stabilizing arms directly coupled to selected ones of said first and second groups of said gears; and first and second brackets statically coupled to said catheter and removably abutted against said first and second stabilizing arms, said first and second brackets being nested within said housing and spaced from remaining ones of said first and second groups of said gears.

4. The device of claim 1, wherein said catheter comprises:

a fiber optic wire and a non-conductive coating concentrically positioned about said fiber optic wire.

5. A portable electronic device for quickly determining the dimensions and contours of a first double-sided key for making a second double-sided key having identical dimensions and contours, said portable electronic device comprising:

a housing;

an elongated and slender catheter having a proximal end seated within said housing and further having a distal end positioned exterior of said housing, said catheter having a cylindrical cross-section provided with a diameter that is suitably sized such that said catheter can be probed through a plug of a lock without contacting a plurality of lower and upper pin pairs seated within the plug;

means for detecting a point where the lower and upper pins come together and line up perfectly with a shear line defined where a cylinder of the lock and a housing of the lock line up, a plurality of LEDs electrically coupled to said detecting means, said LEDs being selectively illuminated when said catheter is displaced along said lower and upper pin pairs;

means for automatically adjusting a position of said catheter as said point of each of said lower and upper pin pairs is detected such that said detecting means becomes automatically positioned next to an adjacent one of said lower and upper pin pairs until said catheter detects a final one of said lower and upper pin pairs within said plug; and means for displaying a plurality of numeric values on said housing, each of said numeric values corresponding to each said points identified by said detecting means.

6. The device of claim 5, wherein said detecting means comprises:

a processor;

a scanner electrically coupled to said processor;

a memory electrically coupled to said processor, said memory including software instructions that cause said detecting means to quickly and effectively detect said point where said lower and upper pin pairs line up with said shear line, said software instructions executing a preprogrammed logic algorithm including the steps of a. calculating a location of said scanner after said scanner has been inserted into the plug, b. calculating a vertical distance that said lower pins have been displaced from said plug, and c. generating and transmitting a signal to said numeric value displaying means such that a numeric value corresponding to said vertical distance is digitally displayed in chronological order according to an order of said lower and upper pin pairs.

7. The device of claim 5, wherein said means for automatically adjusting a position of said catheter comprises:

first and second groups of directly engaged gears nested within said housing and operably conjoined to said processor, said first and second groups of gears being rotatably biased based upon instructions received from said signal during scanning operations;

first and second stabilizing arms directly coupled to selected ones of said first and second groups of said gears; and first and second brackets statically coupled to said catheter and removably abutted against said first and second stabilizing arms, said first and second brackets being nested within said housing and spaced from remaining ones of said first and second groups of said gears.

8. The device of claim 5, wherein said catheter comprises:

a fiber optic wire and a non-conductive coating concentrically positioned about said fiber optic wire.

9. A portable electronic device for quickly determining the dimensions and contours of a first double-sided key for making a second double-sided key having identical dimensions and contours, said portable electronic device comprising:

a housing;

an elongated and slender catheter having a proximal end seated within said housing and further having a distal end positioned exterior of said housing, wherein said distal end of said catheter has an arcuate shape for assisting the user to effectively scan an internal cavity of said plug, said catheter having a cylindrical cross-section provided with a diameter that is suitably sized such that said catheter can be probed through a plug of a lock without contacting a plurality of lower and upper pin pairs seated within the plug;

means for detecting a point where the lower and upper pins come together and line up perfectly with a shear line defined where a cylinder of the lock and a housing of the lock line up, a plurality of LEDs electrically coupled to said detecting means, said LEDs being selectively illuminated when said catheter is displaced along said lower and upper pin pairs;

means for automatically adjusting a position of said catheter as said point of each of said lower and upper pin pairs is detected such that said detecting means becomes automatically positioned next to an adjacent one of said lower and upper pin pairs until said catheter detects a final one of said lower and upper pin pairs within said plug; and means for displaying a plurality of numeric values on said housing, each of said numeric values corresponding to each said points identified by said detecting means.

10. The device of claim 9, wherein said detecting means comprises:

a processor;

a scanner electrically coupled to said processor;

a memory electrically coupled to said processor, said memory including software instructions that cause said detecting means to quickly and effectively detect said point where said lower and upper pin pairs line up with said shear line, said software instructions executing a preprogrammed logic algorithm including the steps of a. calculating a location of said scanner after said scanner has been inserted into the plug, b. calculating a vertical distance that said lower pins have been displaced from said plug, and c. generating and transmitting a signal to said numeric value displaying means such that a numeric value corresponding to said vertical distance is digitally displayed in chronological order according to an order of said lower and upper pin pairs.

11. The device of claim 9, wherein said means for automatically adjusting a position of said catheter comprises:

first and second groups of directly engaged gears nested within said housing and operably conjoined to said processor, said first and second groups of gears being rotatably biased based upon instructions received from said signal during scanning operations;

first and second stabilizing arms directly coupled to selected ones of said first and second groups of said gears; and first and second brackets statically coupled to said catheter and removably abutted against said first and second stabilizing arms, said first and second brackets being nested within said housing and spaced from remaining ones of said first and second groups of said gears.

12. The device of claim 9, wherein said catheter comprises:

a fiber optic wire and a non-conductive coating concentrically positioned about said fiber optic wire.

* * * * *